United States Patent
Pope et al.

(10) Patent No.: US 11,409,569 B2
(45) Date of Patent: Aug. 9, 2022

(54) DATA PROCESSING SYSTEM

(71) Applicant: XILINX, INC., San Jose, CA (US)

(72) Inventors: Steven L. Pope, Cambridge (GB); David J. Riddoch, Cambridgeshire (GB); Derek Roberts, Cambridge (GB)

(73) Assignee: XILINX, INC., San Jose, CA (US)

( * ) Notice: Subject to any disclaimer, the term of this patent is extended or adjusted under 35 U.S.C. 154(b) by 220 days.

(21) Appl. No.: 15/940,837

(22) Filed: Mar. 29, 2018

(65) Prior Publication Data
US 2019/0303209 A1    Oct. 3, 2019

(51) Int. Cl.
*G06F 9/46* (2006.01)
*G06F 9/50* (2006.01)
*G06F 9/455* (2018.01)
*G06F 9/54* (2006.01)

(52) U.S. Cl.
CPC ........ *G06F 9/5044* (2013.01); *G06F 9/45558* (2013.01); *G06F 9/505* (2013.01); *G06F 9/546* (2013.01); *G06F 9/547* (2013.01); *G06F 2009/45595* (2013.01)

(58) Field of Classification Search
CPC ........................................................ G06F 9/52
USPC ....................................................... 718/104
See application file for complete search history.

(56) References Cited

U.S. PATENT DOCUMENTS

| | | | | | |
|---|---|---|---|---|---|
| 5,748,468 | A * | 5/1998 | Notenboom | .......... | G06F 9/3877 326/37 |
| 8,219,712 | B2 * | 7/2012 | Riddoch | ............. | G06F 13/4221 709/250 |
| 8,478,907 | B1 * | 7/2013 | Aloni | .................... | G06F 13/128 709/250 |
| 11,086,801 | B1 * | 8/2021 | Machulsky | .......... | G06F 3/0604 |
| 2002/0107971 | A1 * | 8/2002 | Bailey | .................. | H04L 69/165 709/231 |
| 2003/0046330 | A1 * | 3/2003 | Hayes | .................... | H04L 29/06 709/201 |
| 2003/0204634 | A1 * | 10/2003 | Pinkerton | ............... | H04L 67/34 709/250 |
| 2005/0055435 | A1 * | 3/2005 | Gbadegesin | ........ | H04L 67/1008 709/224 |

(Continued)

FOREIGN PATENT DOCUMENTS

EP      2040177 A1    3/2009

OTHER PUBLICATIONS

EP 191165746.9-1221—European Search Report dated May 8, 2019, 9 pages.

(Continued)

*Primary Examiner* — Mehran Kamran
(74) *Attorney, Agent, or Firm* — Haynes Beffel & Wolfeld LLP; Andrew L. Dunlap; Paul A. Durdik

(57) ABSTRACT

A data processing system being configured to select between different hardware resources for the running of an application configured for the sending and receiving of data over a network. The selection of hardware resources may be between resources on the network interface device, and hardware resources on the host. The selection of hardware resources may be between first and second hardware resources on the network interface device. An API is provided in the data processing system that responds to requests from the application irrespective of the hardware on which the application is executing.

10 Claims, 9 Drawing Sheets

(56) References Cited

U.S. PATENT DOCUMENTS

| | | | |
|---|---|---|---|
| 2005/0165938 A1* | 7/2005 | Cornett | H04L 49/90 709/229 |
| 2008/0189510 A1* | 8/2008 | Riddoch | G06F 13/4221 711/211 |
| 2009/0327495 A1* | 12/2009 | Betts-LaCroix | H04L 67/10 709/226 |
| 2009/0327962 A1* | 12/2009 | Betts-LaCroix | G06F 9/5011 715/833 |
| 2010/0131669 A1* | 5/2010 | Srinivas | G06F 9/452 709/233 |
| 2011/0040897 A1* | 2/2011 | Pope | G06F 9/544 709/250 |
| 2011/0307831 A1* | 12/2011 | Cowan | G06F 3/04817 715/823 |
| 2012/0102098 A1* | 4/2012 | Guillou | G06F 9/5083 709/203 |
| 2012/0176976 A1* | 7/2012 | Wells | H04W 52/0219 370/329 |
| 2012/0254464 A1* | 10/2012 | Armstrong | H04L 69/329 709/238 |
| 2013/0080567 A1* | 3/2013 | Pope | G06F 13/362 709/213 |
| 2013/0152102 A1* | 6/2013 | Zunuino | G06F 11/302 718/104 |
| 2013/0159997 A1* | 6/2013 | Cawlfield | G06F 9/45558 718/1 |
| 2013/0160008 A1* | 6/2013 | Cawlfield | G06F 9/45558 718/1 |
| 2013/0283259 A1* | 10/2013 | Ellis | G06F 9/5055 717/174 |
| 2013/0346470 A1* | 12/2013 | Obstfeld | G06F 9/5044 709/202 |
| 2014/0095666 A1* | 4/2014 | Yampanis | G06F 16/9574 709/219 |
| 2014/0208294 A1* | 7/2014 | Randhir | G06F 9/45512 717/115 |
| 2014/0280581 A1* | 9/2014 | Hernandez | H04W 12/04 709/204 |
| 2014/0310405 A1* | 10/2014 | Pope | H04L 69/326 709/224 |
| 2014/0310709 A1* | 10/2014 | Nirantar | G06F 9/485 718/1 |
| 2015/0370309 A1* | 12/2015 | Burstein | G06F 1/3209 713/323 |
| 2016/0028591 A1* | 1/2016 | Johnson | H04L 63/0815 709/225 |
| 2016/0179567 A1* | 6/2016 | Ding | G06F 9/45558 718/1 |
| 2016/0352870 A1* | 12/2016 | Manapragada | H04L 63/168 |
| 2016/0380921 A1* | 12/2016 | Blagodurov | G06F 3/0631 709/226 |
| 2017/0061566 A1* | 3/2017 | Min | H04L 49/45 |
| 2017/0063808 A1* | 3/2017 | Manapragada | H04L 63/0485 |
| 2017/0351546 A1* | 12/2017 | Habak | G06F 9/505 |
| 2017/0353496 A1* | 12/2017 | Pai | H04L 63/10 |
| 2018/0091356 A1* | 3/2018 | Tabone | H04L 12/2863 |
| 2018/0136979 A1* | 5/2018 | Morris | G06F 9/5055 |
| 2018/0198824 A1* | 7/2018 | Pulapaka | G06F 9/455 |
| 2018/0276018 A1* | 9/2018 | Delaney | G06F 9/45558 |
| 2019/0174322 A1* | 6/2019 | Deviprasad | H04W 16/10 |
| 2019/0190982 A1* | 6/2019 | Pope | H04L 63/1458 |
| 2019/0207867 A1* | 7/2019 | Sivasubramanian | G06F 9/541 |

OTHER PUBLICATIONS

Kim et al., "Connection Handoff Policies for TCP Offload Network Interfaces", 7th Symposium on Operating Systems Design and Implementation, Nov. 6-8, 2006, Seattle, WA, Usenix Association, pp. 293-306.

* cited by examiner

DATA PROCESSING SYSTEM

BACKGROUND OF THE INVENTION

Field

The present application relates to a method, apparatus, system and computer program. In particular, but not exclusively, the present application relates to the selection and use of different hardware resources of a data processing system for running an application.

BACKGROUND

Applications supported by, for example, host computing devices are configured to form application layer messages for transmission over a network. Such messages may be transmitted from the host computing device over a network using network interface devices. Similarly, messages may be received at the host computing device from over a network using a network interface device.

Network interface devices typically provide an interface between the host computing device and a network. The network interface device may be configured to process data which is received from the network and/or process data which is to be put on the network.

SUMMARY

According to a first aspect, there is provided a data processing system comprising: a host computing device comprising hardware resources; a network interface device arranged to couple the host computing device to a network, the network interface device comprising hardware resources; and an application configured to run on one or more of the hardware resources of the data processing system, wherein the data processing system is configured to select between the hardware resources of the host computing device and the hardware resources of the network interface device for running at least part of the application.

In one embodiment, the host computing device comprises an application programming interface configured to receive requests from the application to determine available hardware resources of the data processing system.

In one embodiment, the data processing system is configured to select between the hardware resources of the network interface device and the hardware resources of the host computing device in dependence upon at least one of: system workload; availability of the hardware resources of the host computing device; and availability of the hardware resources of the network interface device.

In one embodiment, the data processing system comprises a runtime support for the application, wherein the runtime support is configured to perform the selection between the hardware resources of the host computing device and the hardware resources of the network interface device for running the application.

In one embodiment, the runtime support comprises a virtual machine environment.

In one embodiment, the application is configured to at least one of: form a message for transmission over the network; and consume a message received over the network.

According to a second aspect, there is provided a network interface device arranged to couple the host computing device to a network, the network interface device comprising first hardware resources and second hardware resource, the network interface device comprising: an application configured to run on one or more of the hardware resources of the network interface device, wherein the network interface device is configured to select between the first and second hardware resources for running the application.

In one embodiment, the application is configured to make requests to an application programming interface of the host computing device to determine available hardware resources of the data processing system.

In one embodiment, the network interface device is configured to select between the first hardware resources and the second hardware resources in dependence upon at least one of: system workload; availability of the first hardware resources; and availability of the second hardware resources.

In one embodiment, the network interface device comprises a runtime support for the application, wherein the runtime support is configured to perform the selection between the first hardware resources and the second hardware resources.

In one embodiment, the runtime support comprises a virtual machine environment.

In one embodiment, the application is configured to at least one of: form a message for transmission over the network; and consume a message received over the network.

According to a third aspect, there is provided a host computing device comprising: an interface to a network interface device arranged to couple the host computing device to a network; and hardware resources configured to run an application, wherein the host computing device is configured to select between the hardware resources of the host computing device and hardware resources of the network interface device for running the application.

According to a fourth aspect, there is provided a method comprising: selecting hardware resources for running an application, the selection being made between hardware resources of a host computing device and hardware resources of a network interface device, wherein the network interface device is arranged to couple the host computing device to a network; and causing an application to run on the selected hardware resources.

According to a fifth aspect, there is provided a method comprising: selecting hardware resources for running an application, the selection being made between first hardware resources of the network interface device and second hardware resources of the network interface device, wherein the network interface device is arranged to couple a host computing device to a network; and causing an application to run on the selected hardware resources.

According to a sixth aspect, there is provided a method implemented in a host computing device, the method comprising: selecting hardware resources for running an application, the selection being made between hardware resources of the host computing device and hardware resources of a network interface device, wherein the network interface device is arranged to couple the host computing device to a network; and causing an application to run on the selected hardware resources.

According to a seventh aspect, there is provided a non-transitory computer readable medium encoded with instructions that when executed by one or more processors of a data processing system performs a method, the method comprising: selecting hardware resources for running an application, the selection being made between hardware resources of a host computing device and hardware resources of a network interface device, wherein the network interface device is arranged to couple the host computing device to a network; and causing an application to run on the selected hardware resources.

According to an eighth aspect, there is provided a non-transitory computer readable medium encoded with instructions that when executed by one or more processors of a network interface device performs a method, the method comprising: selecting hardware resources for running an application, the selection being made between first hardware resources of the network interface device and second hardware resources of the network interface device, wherein the network interface device is arranged to couple a host computing device to a network; and causing an application to run on the selected hardware resources.

According to a ninth aspect, there is provided a non-transitory computer readable medium encoded with instructions that when executed by one or more processors of a host computing device performs a method, the method comprising: selecting hardware resources for running an application, the selection being made between hardware resources of the host computing device and hardware resources of a network interface device, wherein the network interface device is arranged to couple the host computing device to a network; and causing an application to run on the selected hardware resources.

According to an tenth aspect, there is provided a data processing system comprising: a host computing device comprising hardware resources; a network interface device arranged to couple the host computing device to a network, the network interface device comprising hardware resources; and an application programming interface configured to receive requests from a first entity running on the hardware of the host computing device and a second entity running on the hardware of the network interface device, wherein operations performed by the application programming interface in response to the requests are independent of whether the requests are received from the first entity or the second entity.

In one embodiment, the first entity comprises a first application and the second entity comprises a second application.

In one embodiment, the first entity and the second entity are different instances of an application.

In one embodiment, the first entity and the second entity each comprise components of at least one runtime support.

In one embodiment, the requests comprise at least one of: requests for access to hardware resources on behalf of an application; and requests for an indication as to the availability of hardware resources of the data processing system.

In one embodiment, responses to the requests provided by the application programming interface are independent of the hardware on which the first entity and the second entity execute.

According to a eleventh aspect, there is provided a host computing device comprising: an interface to a network interface device arranged to couple the host computing device to a network; hardware resources configured to run a first entity; and an application programming interface configured to receive requests from the first entity and from a second entity running on the hardware of the network interface device, wherein operations performed by the application programming interface in response to the requests are independent of whether the requests are received from the first entity or the second entity.

According to a twelfth aspect, there is provided a method implemented in a data processing system, the method comprising: receiving at an application programming interface, a request from a first entity executing on hardware of a host computing device; receiving at the application programming interface, a request from a second entity executing on hardware of a network interface device; and the application programming interface performing operations in response to the requests that are independent of whether the requests are received from the first entity or the second entity.

According to an thirteenth aspect, there is provided a method implemented in a host computing device, the method comprising: receiving at an application programming interface, a request from a first entity executing on hardware of the host computing device; receiving at the application programming interface, a request from a second entity executing on hardware of a network interface device; and the application programming interface performing operations in response to the requests that are independent of whether the requests are received from the first entity or the second entity.

According to a fourteenth aspect, there is provided a non-transitory computer readable medium encoded with instructions that when executed by one or more processors of a data processing system performs a method, the method comprising: receiving at an application programming interface, a request from a first entity executing on hardware of a host computing device; receiving at the application programming interface, a request from a second application executing on hardware of a network interface device; and the application programming interface performing operations in response to the requests that are independent of whether the requests are received from the first entity or the second entity.

According to a fifteenth aspect, there is provided a non-transitory computer readable medium encoded with instructions that when executed by one or more processors of a host computing device performs a method, the method comprising: receiving at an application programming interface, a request from a first entity executing on hardware of the host computing device; receiving at the application programming interface, a request from a second entity executing on hardware of a network interface device; and the application programming interface performing operations in response to the requests that are independent of whether the requests are received from the first entity or the second entity.

According to a sixteenth aspect, there is provided a computer program comprising instructions such that when the computer program is executed on a computing device provides a method according to any of: the fourth to sixth aspects, the twelfth aspect, and the thirteenth aspect.

BRIEF DESCRIPTION OF FIGURES

Some embodiments will now be described by way of example only with reference to the accompanying figures in which.

DETAILED DESCRIPTION

The following description is presented to enable any person skilled in the art to make and use one or more embodiments, and is provided in the context of particular examples. Various modifications to the disclosed embodiments will be readily apparent to those skilled in the art.

The general principles defined herein may be applied to other embodiments and examples without departing from the spirit and scope of the present invention. Thus, the present invention is not intended to be limited to the embodiments shown, but is to be accorded the widest scope consistent with the principles and features disclosed herein.

When data is to be transferred between two data processing systems over a data channel, such as a network, one or both of the data processing systems has a suitable network interface to allow it to communicate across the channel. Often the network is based on Ethernet technology. Other embodiments may alternatively or additionally use other technology. Data processing systems that are to communicate over a network may be equipped with network interfaces that are capable of supporting the physical and logical requirements of the associated network protocol. The physical hardware component of network interfaces may be referred to as network interface devices or so called network interface cards (NICs).

Most computer systems include an operating system (OS) through which user level applications communicate with the network. A portion of the operating system, sometimes referred to as the kernel, may have one or more protocol stacks for protocol processing data to form data packets for transmission over the network and protocol processing data packets received from the network. By providing these functions in the operating system kernel, the complexities of and differences among network interface devices can be hidden from the user level application. Alternatively or additionally, the network hardware and other system resources (such as memory) can be safely shared by many applications and the system can be secured against faulty or malicious applications.

Some computer systems may comprise a plurality of guest operating systems managed by a hypervisor, with each guest operating system supporting multiple application endpoints having their own network addresses. Each of the applications may provide data to be communicated over the network.

Figure 1:
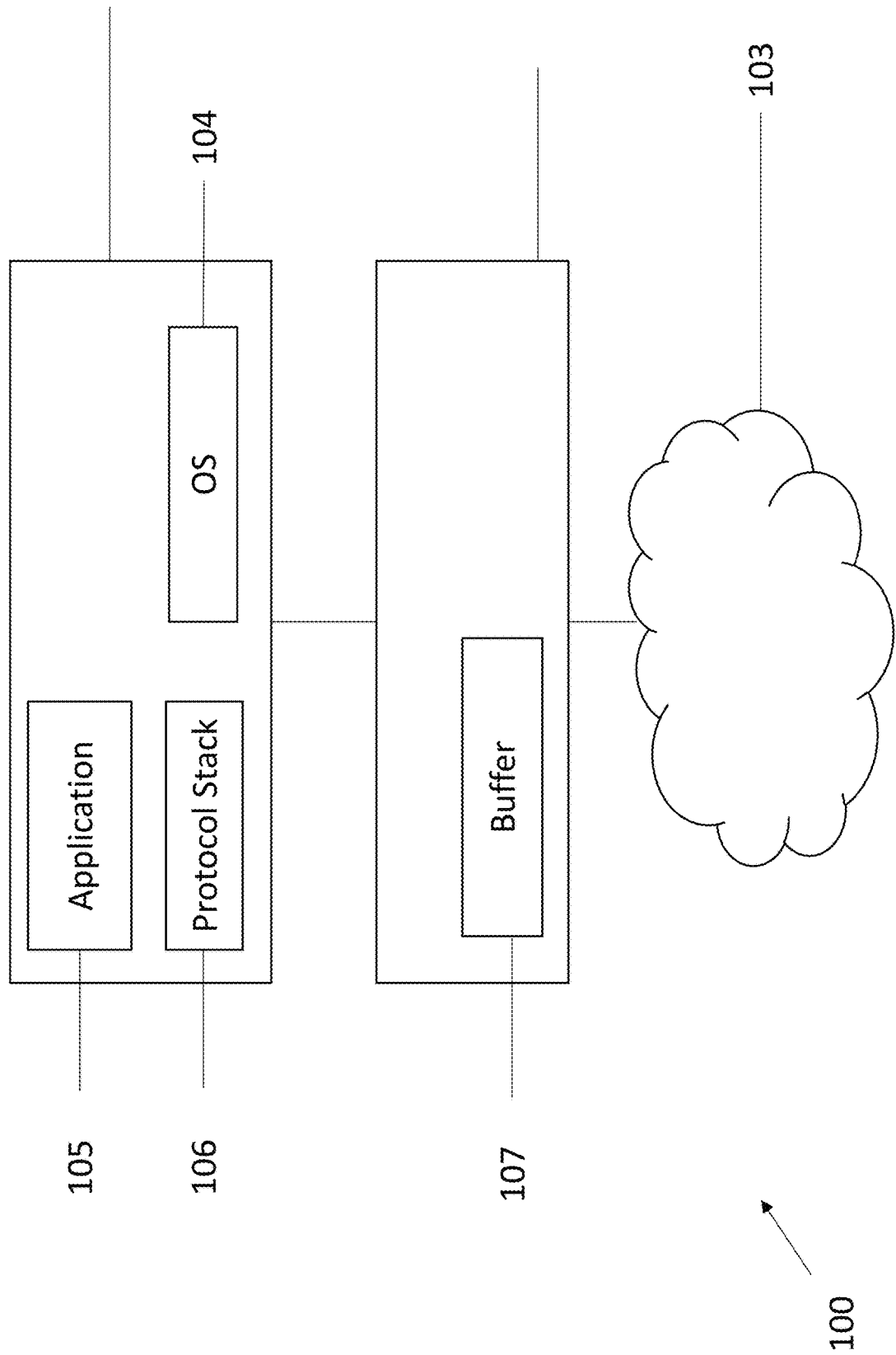
FIG. 1 shows a schematic view of a data processing system coupled to a network.

An example of a data processing system 100 for carrying out transmission across a network is shown in FIG. 1. The data processing system 100 comprises a host computing device 101 coupled to a network interface device 102 that is arranged to interface the host 101 to network 103. The host computing device 101 includes an operating system 104 supporting one or more user level applications 105, The host computing device 101 may also include a network protocol stack 106. For example, the protocol stack 106 may be a component of the application 105, a library with which the application 105 is linked, or be provided by the operating system 104. In some embodiments, more than one protocol stack 106 may be provided.

The network protocol stack 106 may be a Transmission Control Protocol (TCP) stack. The application 105 can send and receive TCP/IP messages by opening a socket and reading and writing data to and from the socket, and the operating system 104 causes the messages to be transported across the network 103. For example, the application 105 can invoke a system call (syscall) for transmission of data through the socket and then via the operating system 104 to the network 103. This interface for transmitting messages may be known as the message passing interface.

During operation of the data processing system 100, data to be transmitted onto the network 103 may be transferred from the host computing device 101 to the network interface device 102 for transmission. In one example, data packets may be transferred from the host 101 to the network interface device 102 directly by the host processor. The host 101 may provide data to one or more buffers 107 located on the network interface device 102. The network interface device 102 may then prepare the data packets and transmit them over the network 103.

In the example data processing system 100, the application 105 that is responsible for sending and receiving messages is located on the host 101. However, in accordance with examples of the present application, a number of different possible hardware resources may be used to provide the application. For example, the application may alternatively or additionally be provided by a host central processing unit (CPU), by a host graphical processing unit (GPU), by a host Intelligence Processing Unit (IPU), by a host Tensor Processing Unit (TPU), by a field programmable gate array (FPGA) logic present on a network interface device, by an embedded CPU on a network interface device or by other processing devices present on a host and/or on a network interface device. FIGS. 2, 3, 4, 5, 8, and 9 illustrate examples of data processing systems according to embodiments of the application. In some examples, these data processing systems may comprise a host computing device having a single operating system. The protocol stack and application illustrated being capable of running on the single operating system. In other embodiments, the data processing systems may have multiple guest operating systems being managed by a hypervisor. In this case, there may be multiple applications configured to execute on separate operating systems and being configured to send and receive data over the network.

Figure 2:
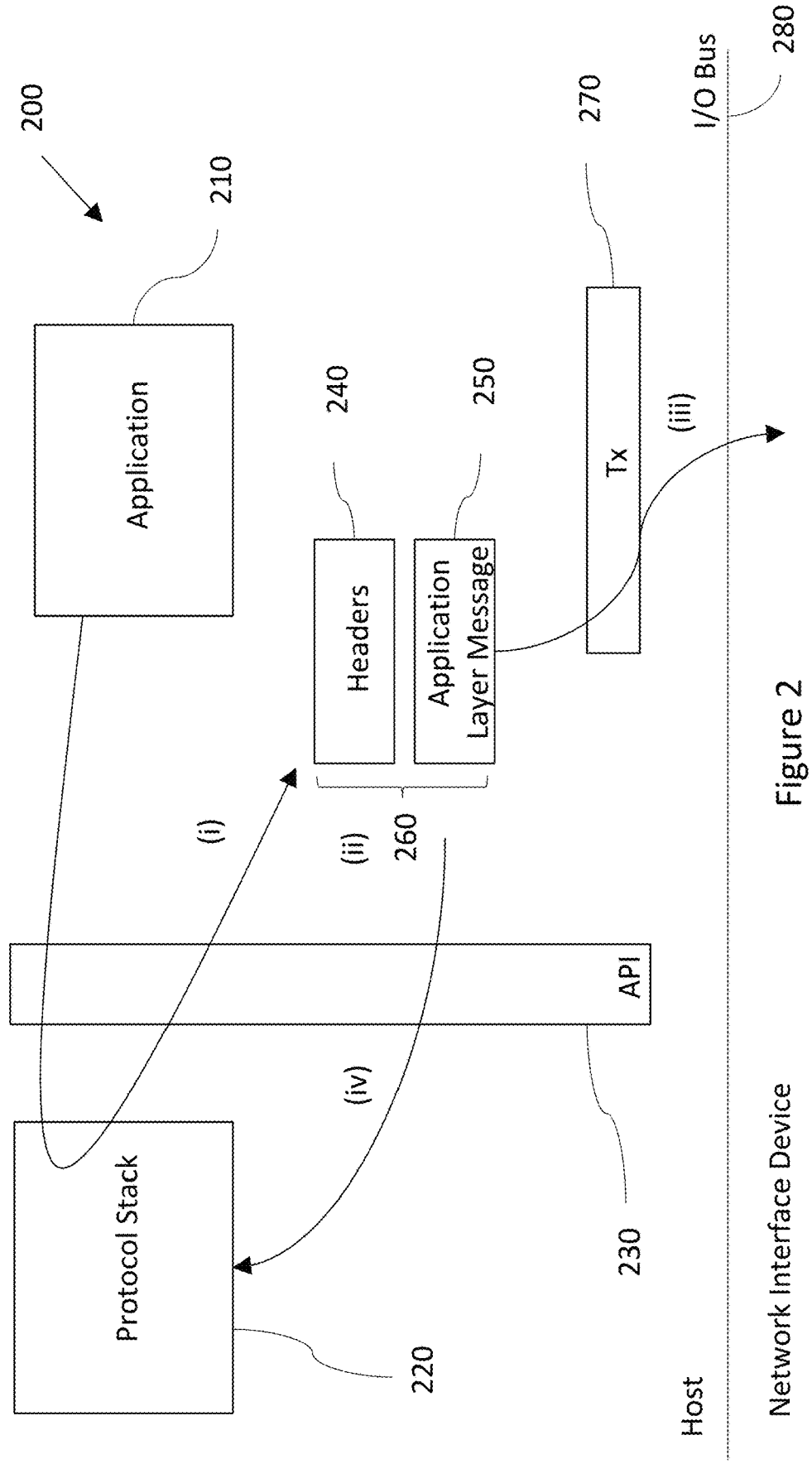
FIG. 2 shows a schematic view of a data processing system comprising an application configured to run on a host computing device and provide data for transmission over a network.

Reference is made to FIG. 2, which shows an example of a data processing system 200, having an application 210 configured to run on hardware resources of the host computing device. Such hardware resources may be one or more processors, such as CPUs, GPUs, IPUs, and TPUs. The host computing device also comprises a protocol stack 220 for performing protocol processing and providing headers for data packets. The protocol stack 220 may comprise a protocol stack 220 configured to perform transport protocol processing of data. The protocol stack 220 may comprise a TCP/IP protocol stack. The protocol processing performed by the stack 220 may comprise transport protocol processing. The transport protocol processing may be TCP/IP protocol processing. The protocol processing performed by the stack 220 may comprise some upper layer processing, such as iSCSI (Internet Small Computer Systems Interface) or NVME (Non-Volatile Memory Express) processing. The application 210 may perform the remaining upper layer processing for a data packet (i.e. the application may complete the remaining upper processing layers). The host computing device also comprises an application programming interface 230, by which the application 210 can communicate with the protocol stack 220 by, for example, requesting headers for data packets for the transmission of messages over the network. The host computing device also comprises a transmit function 270, which is invoked by the application 210 to transmit data packets over the network. The transmit function 270 may a library, such as an Ether Fabric Virtual Interface (EFVI) and/or a Data Plane Development Kit (DPDK) library or a raw socket.

FIG. 2 illustrates the steps that may be involved in the process of transmitting data over the network. These steps are an example only. In other examples, the order in which the steps are carried out may vary.

At step (i), the application 210 issues a request for one or more headers for the transmission of a data packet to the protocol stack 220 through the API 230. In response, the protocol stack 220 provides the one or more headers 240 to the application 210. The protocol stack 220 may provide the one or more headers 240 by writing the one or more headers 240 to a memory to which the application 210 has access. The protocol stack 220 may write the one or more headers to this memory by completing fields in an object passed as an argument to the API call. The application 210 forms an application layer message 250 for transmission over the network.

At step (ii), the application 210 is configured to combine the one or more headers 240 with the application layer message 250 to form a data packet 260.

At step (iii), the application 210 is configured to invoke the transmit function 270 to cause the data packet 260 to be transmitted over the network. The data packet 260 is passed to the network interface device that is coupled to the host computing device via the I/O bus 280. The network interface device is configured to transmit the data packet 260 over the network.

At step (iv), the application 210 provides the transmitted frame to the protocol stack 220 via the API 230. The protocol stack 220 performs protocol processing for the transmitted data packet. The protocol processing performed by the stack 220 at step (iv) may comprise transport protocol processing. The transport protocol processing may comprise updating the state associated with a transport stream to which the transmitted data packet belongs. The transport protocol processing may comprise TCP/IP protocol processing.

Hence, in the example described with respect to FIG. 2, the hardware resources on which the application 210 executes, and hence which form the application layer message are part of the host computing device. The network interface device, in this example, may be configured to perform the transmit operation only.

Figure 8:
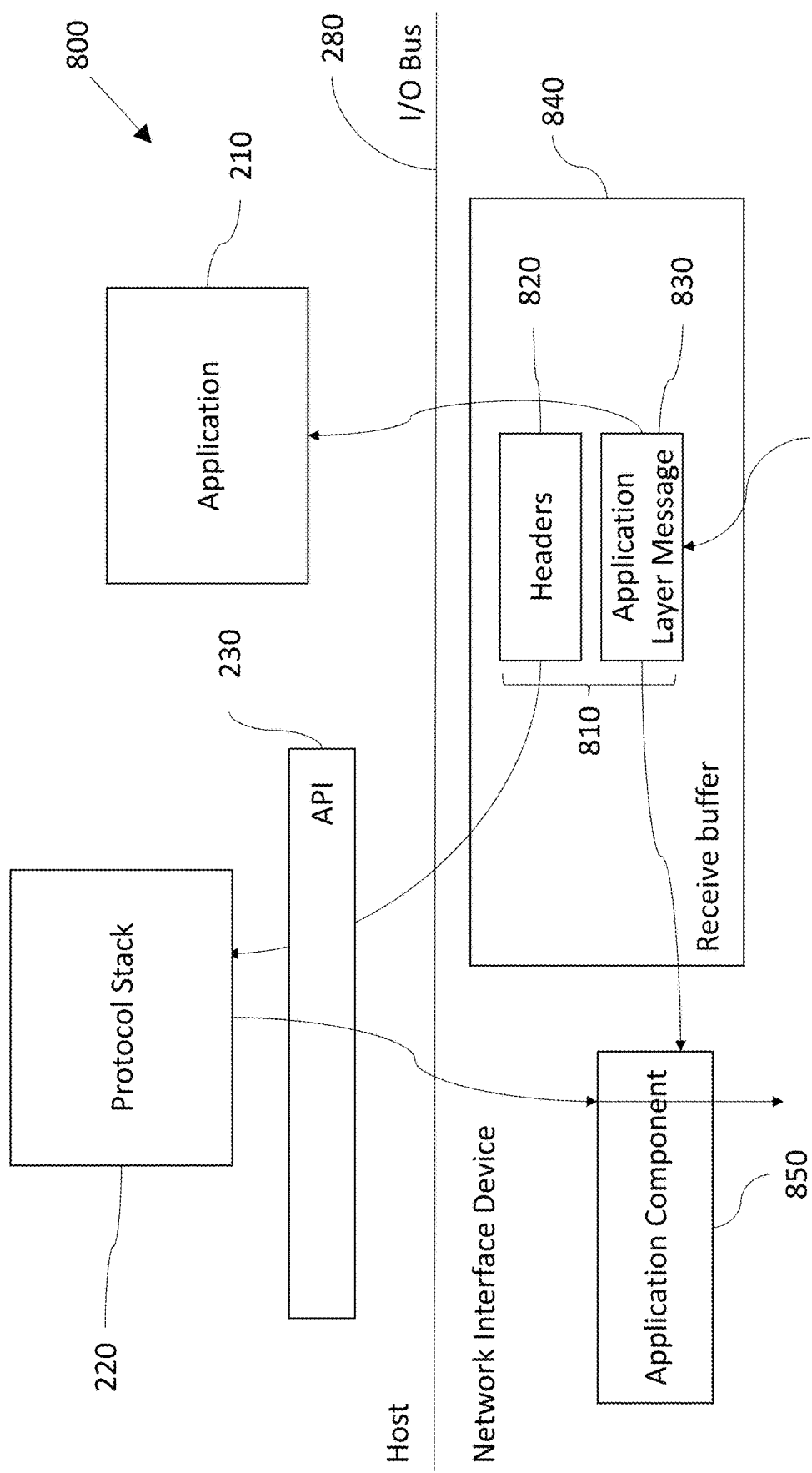
FIG. 8 shows a schematic view of a data processing system comprising an application configured to run on a host computing device and receive data from a network.

Reference is made to FIG. 8, which shows an example of a data processing system 800. The data processing system 800 may be the same as the data processing system 200 illustrated in FIG. 2, and so like elements of the system 800 have been indicated with like elements of the system 200. FIG. 8 illustrates the steps that may be involved in the process of receiving data from over the network. These steps are an example only. In other examples, the order in which the steps are carried out may vary.

A data packet 810 is received at the network interface device and is written to a receive buffer 840 in the network interface device. An event notification may be written to an event queue associated with the receive buffer 840 to notify a processor of the host of the arrival of the data packet. The network interface device is configured to first separate the network and transport layers headers from the payload. The network interface device then writes the payload data into the receive buffer. The network interface device may be configured to write the payload data in byte stream order in dependence on the information (e.g. sequence number, etc) in the transport headers.

In some examples, if the receive buffer 840 contains in order data received from the network, then this is indicated to the application 210 by the network interface device. In response to receiving the indication that the receive buffer 840 contains in order data, the application 210 may process the in order data prior to transport processing being performed by the protocol stack 220. In some examples, if the receive buffer 840 contains out of order data, the application 210 may defer processing of the data, until corresponding in order data is available. The in order data may be received in the receive buffer 840 via a retransmission over the network.

In some examples, if the receive buffer 840 contains data which has passed one or more transport layer validity checks (e.g. a checksum) then this is indicated to the application 210. In response to receiving the indication that data in the receive buffer 840 passes the one or more transport layer validity checks, the application 210 may process the data having passed said one or more validity checks prior to transport processing being performed by the protocol stack 220. In some examples, if the receive buffer 840 contains data failing the one or more validity checks, the application 210 may defer processing of the data, until corresponding data which passes the one or more validity checks is available. The data passing the one or more validity checks may be received in the receive buffer 840 via a retransmission over the network.

The application 210 can determine to process one or more of: out of order data, bad data (data contain errors), or data with missing regions that is held in the receive buffer 840. Alternatively, the application 210 may wait for in order, correct data (which may require a retransmission from over the network) to be received from over the network.

Therefore, the application 210 receives the payload/application layer message from the receive buffer 840 in the network interface device. The application 210 can consume the application layer message. Additionally or alternatively, a copy of the payload/application layer message can be provided to the application component 850 executing on the network interface device. The runtime support (not shown in FIG. 8) determines whether the payload is delivered to the application 210 on the host, the application component 850 on the network interface device, or to both of them. The runtime support may make such a determination separately for different data flows. In other words, the determination may be made on a per flow basis.

The network interface device delivers the headers 820 and, optionally, the entire data packet 810 to the protocol stack 220. If only the headers 820 are delivered to the protocol stack 220, then the network interface device performs one or more validity checks (e.g. checksum calculations) for the data packet 810 and provides an indication of the results of the one or more validity checks to the protocol stack 220.

The protocol stack 220 performs protocol processing of the data packet 810. The protocol stack 220 may perform transport processing for the data packet 810. The transport protocol processing may be TCP/IP protocol processing. The protocol processing performed by the stack 220 may comprise at least some upper layer processing, such as iSCSI (Internet Small Computer Systems Interface) or NVME (Non-Volatile Memory Express) processing.

The protocol processing may produce a message that is to be sent over the network. In response to the protocol processing, the data processing system may produce and transmit the message over the network. The message may be an acknowledgment message (e.g. a TCP ACK). The message could contain information from which the transmitting protocol stack could infer one of: an acknowledgment of the received data packet 810, an instruction to change the protocol window size, an instruction to adjust the transmission rates, a request for retransmission of some or all of the data. The message represents the result of the receive processing of the data packet 810.

The application code which is causing the connection to occur is on the host processing device. However in embodiments, a component 850 of the application 210 is provided in the network interface device. The message (e.g. an acknowledgment message) that is produced as a result of the protocol processing (and transmitted over the network) is provided though the API 230 to the application component 850 on the network interface device. The application component 850 can modify this message which is to be transmitted over the network. For example, if the application 210 is configured to process the data irrespective of whether or not it passes a validity check, e.g. if the application 210 doesn't require data which it receives to be in order, and is configured to process it regardless, then the application component can change a message requesting retransmission (e.g. a NACK/negative acknowledgment) message to a message that does not request retransmission (e.g. an ACK/acknowledgement) such that no retransmission is requested. The application component 850 may convert a NACK to an ACK, with the ACK then being transmitted over the network to the sender of the data packet. The runtime support may determine whether an NACK message received at the application component 850 is to be modified. The runtime support may determine that NACKs are to be converted to ACKs if it is determined that the application 210 is configured to process out of order data. More broadly, the runtime support may be configured to determine whether and how the application component 850 may modify messages received from the protocol stack 220 as a result of the protocol processing of the headers 820.

The runtime support is provided as the runtime support for the application irrespective of the hardware (e.g. on the network interface device or the host) on which the application executes. The runtime support is also provided as the runtime support for separate components of the application 210, e.g. application component 850.

The protocol stack 220 may also be configured to provide at least part of the payload of the data packet 810 to the application component 850. In some examples, the application component 850 is configured to process the data after it was been protocol processed by the protocol stack 220. In other examples, the application component 850 may not wait for protocol processing to complete, but may pre-process the data.

Figure 3:
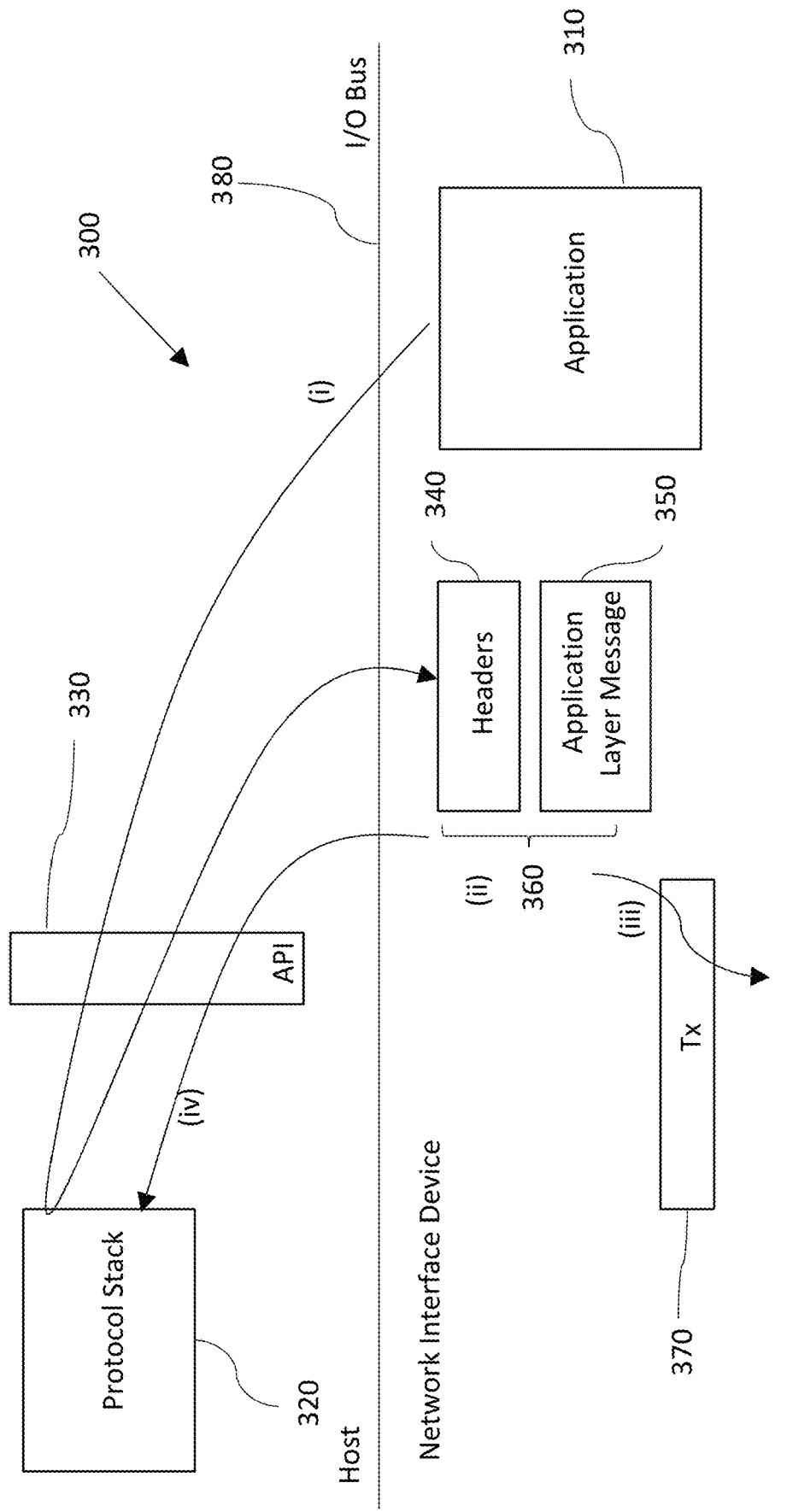
FIG. 3 shows a schematic view of a data processing system comprising a an application configured to run on a network interface device and provide data for transmission over a network.

Reference is made to FIG. 3, which shows an example of a data processing system 300, having an application 310 configured to run on hardware resources of the network interface device. Such hardware resources may be one or more processors, such as FPGA logic, or one or more embedded CPUs. The host computing device comprises a protocol stack 320, such as a TCP/IP protocol stack, for performing protocol processing and providing headers 340 for data packets. The host computing device also comprises an application programming interface 330, by which the application 310 can communicate with the protocol stack 320 by, for example, requesting headers 340 for data packets for the transmission of messages over the network. The protocol stack 320 may comprise a protocol stack 320 configured to perform transport protocol processing of data. The protocol stack 320 may comprise a TCP/IP protocol stack. Although the protocol stack 320 is shown as being part of the host computing device, in some examples, the protocol stack 320 may be provided on the network interface device. The protocol stack 320 may be configured to run on an embedded CPU of the network interface device. The protocol processing performed by the stack 320 may comprise transport protocol processing. The transport protocol processing may be TCP/IP protocol processing. The protocol processing performed by the stack 320 may comprise upper layer processing, such as iSCSI or NVME processing. The application 310 may perform the remaining upper layer processing for a data packet (i.e. the application may complete the remaining upper processing layers). The network interface device comprises a transmit function 370, which is invoked by the application 310 to transmit data packets over the network. The transmit function 370 may a library, such as an EFVI and/or DPDK or a raw socket. The transmit function 370 may be provided by an embedded CPU or a hardware API of the network interface device. The host computing device and the network interface device are configured to communicate with one another over the I/O Bus 380. FIG. 3 illustrates the steps that may be involved in the process of transmitting data over the network. These steps are an example only. In other examples, the order in which the steps are carried out may vary.

At step (i), the application 310 issues a request for one or more headers for the transmission of a data packet to the protocol stack 320 through the API 330. In response, the protocol stack 320 provides the one or more headers 340 to the application 310. The protocol stack 320 may provide the one or more headers 340 by writing the one or more headers 340 to a memory to which the application 310 has access. The application 310 also forms an application layer message 350 for transmission over the network. The application 310 may perform upper layer protocol processing when forming the application layer message 350.

At step (ii), the application 310 is configured to combine the one or more headers 340 with the application layer message 350 to form a data packet 360.

At step (iii), the application 310 is configured to invoke the transmit function 370 to cause the data packet 360 to be transmitted over the network. The transmit function 370 is configured to transmit the data packet 360 over the network.

At step (iv), the protocol stack 320 then performs protocol processing for the transmitted data packet. The protocol processing performed by the stack 320 at step (iv) may comprise transport protocol processing. The transport protocol processing may comprise updating the state associated with a transport stream to which the transmitted data packet belongs. The transport protocol processing may comprise TCP/IP protocol processing.

Hence, in the example described with respect to FIG. 3, the hardware resources on which the application 310 executes and hence, which form the application layer message are present on the network interface device. However, the application 310 is able to access, the host protocol stack 320 via the API 330.

Figure 9:
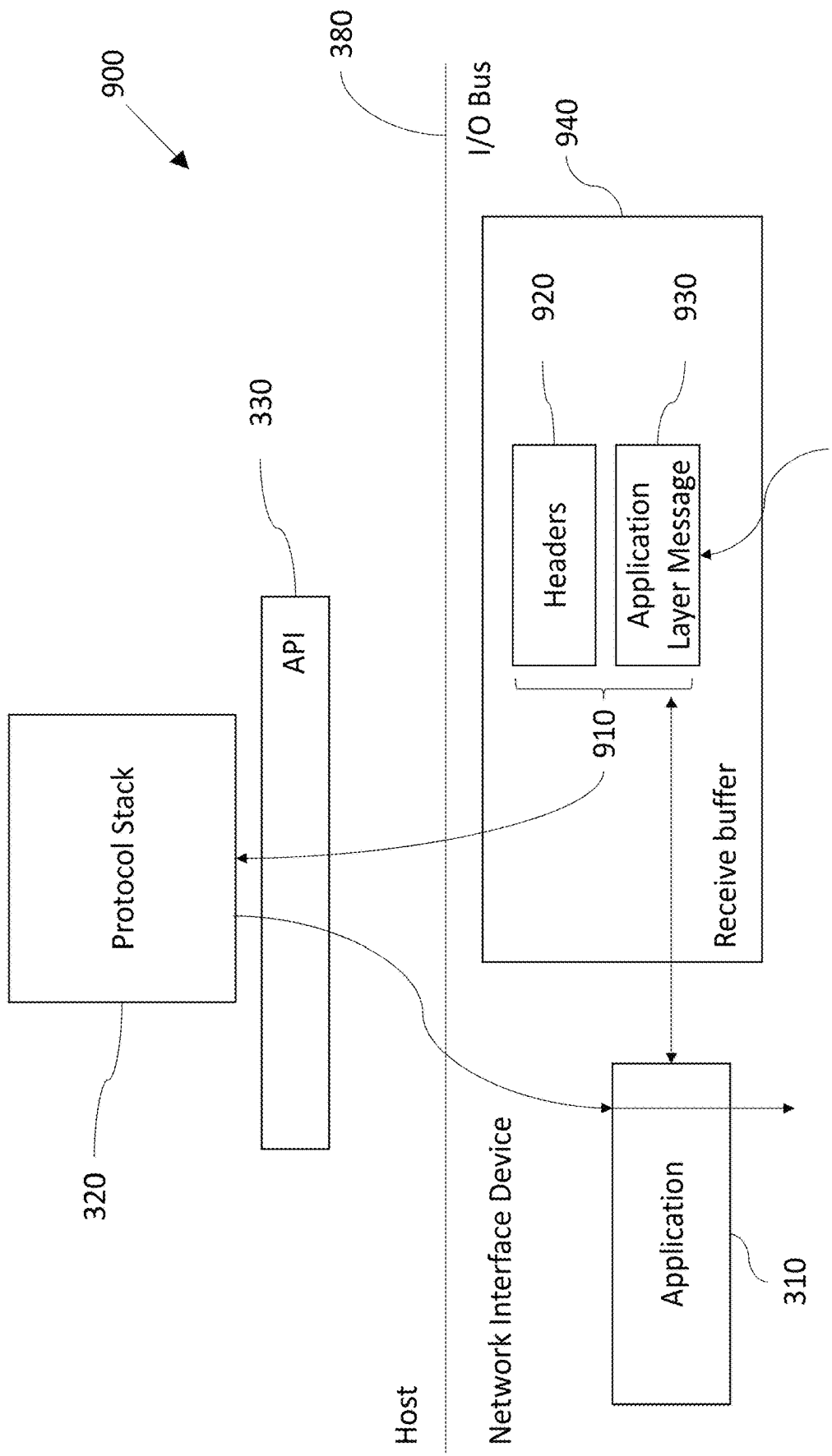
FIG. 9 shows a schematic view of a data processing system comprising an application configured to run on a network interface device and receive data from a network.

Reference is made to FIG. 9, which shows an example of a data processing system 900. The data processing system 900 may be the same as the data processing system 300 illustrated in FIG. 3, and so like elements of the system 900 have been indicated with like elements of the system 300. FIG. 9 illustrates the steps that may be involved in the process of receiving data from over the network. These steps are an example only. In other examples, the order in which the steps are carried out may vary.

A data packet 910 is received at the network interface device and is written to a receive buffer 940 in the network interface device. An event notification may be written to an event queue associated with the receive buffer 940 to notify a processor of the host of the arrival of the data packet. The network interface device is configured to first separate the network and transport layers headers from the payload. The network interface device then writes the payload data into the receive buffer 940. The network interface device may be configured to write the payload data in byte stream order in dependence on the information (e.g. sequence number, etc) in the transport headers.

In some examples, if the receive buffer 940 contains in order data received from the network, then this is indicated to the application 310 by the network interface device. In response to receiving the indication that the receive buffer 940 contains in order data, the application 310 may process the in order data prior to transport processing being performed by the protocol stack 320. In some examples, if the receive buffer 940 contains out of order data, the application 310 may defer processing of the data, until corresponding in order data is available. The in order data may be received in the receive buffer 940 via a retransmission over the network.

In some examples, if the receive buffer 940 contains data which has passed one or more transport layer validity checks (e.g. a checksum) then this is indicated to the application 310. In response to receiving the indication that data in the receive buffer 940 passes the one or more transport layer validity checks, the application 310 may process the data having passed said one or more validity checks prior to transport processing being performed by the protocol stack 320. In some examples, if the receive buffer 940 contains data failing one or more validity checks, the application 310 may defer processing of the data, until corresponding data which passes the one or more validity checks is available. The data passing the one or more validity checks may be received in the receive buffer 940 via a retransmission from over the network.

The application 310 can determine to process one or more of: out of order data, bad data, or data with missing regions that is held in the receive buffer 940. Alternatively, the application 310 may wait for in order, correct data (which may require a retransmission from over the network) to be received from over the network.

Therefore, the application 310 receives the payload/application layer message from the receive buffer 940 in the network interface device. The application 310 can consume the application layer message.

The network interface device delivers the headers 920 and, optionally, the entire data packet 910 to the protocol stack 320. If only the headers 920 are delivered to the protocol stack 320, then the network interface device performs one or more validity checks (e.g. checksum calculations) for the data packet 910 and provides an indication of the results of the one or more validity checks to the protocol stack 320.

The protocol stack 320 performs protocol processing of the data packet 910. The protocol stack 320 may perform transport processing for the data packet 910. The transport protocol processing may be TCP/IP protocol processing. The protocol processing performed by the stack 320 may comprise at least some upper layer processing, such as iSCSI (Internet Small Computer Systems Interface) or NVME (Non-Volatile Memory Express) processing.

The protocol processing may produce a message that is to be sent over the network. In response to the protocol processing, the data processing system may produce and transmit the message over the network. The message may be an acknowledgment message (e.g. a TCP ACK). The message could contain information from the which transmitting protocol stack could infer one of: an acknowledgment of the received data packet 910, an instruction to change the protocol window size, an instruction to adjust the transmission rates, a request for retransmission of some or all of the data. The message represents the result of the receive processing of the data packet 910.

The message produced as a result of the protocol processing (and transmitted over the network) may be provided though the API 330 to the application 310 on the network interface device. The application 310 can modify any message which is to be transmitted over the network. For example, if the application 310 is configured to process the data irrespective of whether or not it passes a validity check, e.g. if the application 310 doesn't require data which it receives to be in order, and is configured to process it regardless, then the application 310 can change a message requesting retransmission (e.g. a NACK/negative acknowledgment) message to a message that does not request retransmission (e.g. an ACK/acknowledgement) such that no retransmission is requested. The application 310 may convert a NACK to an ACK, with the ACK then being transmitted over the network to the sender of the data packet. The runtime support may determine whether an NACK message received at the application 310 is to be modified. The runtime support may determine that NACKs are to be converted to ACKs if it is determined that the application 310 is configured to process out of order data. More broadly, the runtime support may be configured to determine whether and how the application 310 may modify messages received from the protocol stack 320 as a result of the protocol processing of the headers 920.

The protocol stack 320 may also be configured to provide at least part of the payload of the data packet 910 to the application 310. In some examples, the application 310 is configured to process the data after it was been protocol processed by the protocol stack 320. In other examples, the application 310 may not wait for protocol processing to complete, but may pre-process the data.

Therefore, as illustrated by FIGS. 2, 3, 8, and 9, for both transmit and receive processing, there is a plurality of different possibilities as regards to the hardware of a data processing system on which applications may run.

In accordance with examples of the application, a dynamic selection between the hardware resources of the data processing system on which the application executes may be carried out. The application may be expressed in a language with runtime support (i.e. having a runtime system). In some examples, the runtime support may perform the selection as to the hardware resources on which the application is to execute. The hardware resources may be predetermined on the basis of a static analysis. The data processing determines in dependence upon the system workload and availability of different hardware resources, appropriate hardware resources on which the application is to execute. For example, the data processing system may be configured to dynamically instantiate or move the application between one of more of: a host CPU, FPGA logic on the network interface device, an embedded CPU on the network interface device, a GPU on the host computing device, and an IPU/TPU on the host computing device. This selection of hardware resources could be carried out by the host computing device, the network interface device or a combination of the two.

The runtime support (or runtime system) may be understood to be the environment in which a program running a particular language executes. The runtime support may provide a list of callable functions to applications written in a particular programming language. Additionally or alternatively, the runtime support may provide dynamic functions that do not need to be called by the application, such as memory management or selection of hardware resources on which the application operates.

In examples of the application, the runtime support may run on the host computing device and/or the network interface device. The runtime support may divided into different components, with different components being configured to execute on different hardware of the data processing system. For example, one or more components may be configured to execute on the host computing device and one or more components may be configured to execute on the network interface device.

Where the runtime support selects the hardware resources to be used for running the application, the runtime support may issue a request to the operating system. The runtime support may issue requests to the operating system of the host computing device via an API for access to hardware resources of the data processing system on behalf of the application. The operating system is configured to grant access to the hardware of the data processing system in response to the request. The API may respond to the requests from the operating system independently of whether they are received from a component of the runtime support running on the network interface device or a component of the network interface device running on the host computing device.

The selection of the hardware resources that is performed by the runtime support may be predetermined. The data processing system may store a data structure indicating to the runtime support, hardware that is to be used for the processing of the application. The runtime support may select the hardware resources to be used for running the application in dependence upon the data structure. The runtime support may then issue a request to the operating system for access to the hardware resources in dependence on the indication in the data structure.

The selection of the hardware resources that is performed by the runtime support may be performed based on an analysis of the code of the application carried out by the runtime support. The runtime support may analyse the functions called in the code of the application and select hardware based on a determination of the appropriate hardware for executing these functions.

The selection of the hardware resources that is performed by the runtime support may be performed based on an analysis of the running of the application. For example, the runtime support may analyse the performance characteristics of the application when running on hardware, and update the selection of the hardware on which the application is to run on the basis of this analysis. The runtime support may analyse the performance of the application when running on a first hardware or second hardware of the data processing system and, in response, determine to modify the selection of the hardware on which the application is to run, e.g. to cause the execution of the application to move to the other of the first hardware or the second hardware.

In any case, when the runtime support has made a selection of hardware on which the application is configured to run, the runtime support may issue a request to the operating system via the API to request use of the selected hardware resources for execution by the application. The runtime support may be configured to compile the application code to run on the selected hardware. The application may then run on the selected hardware.

Figure 4:
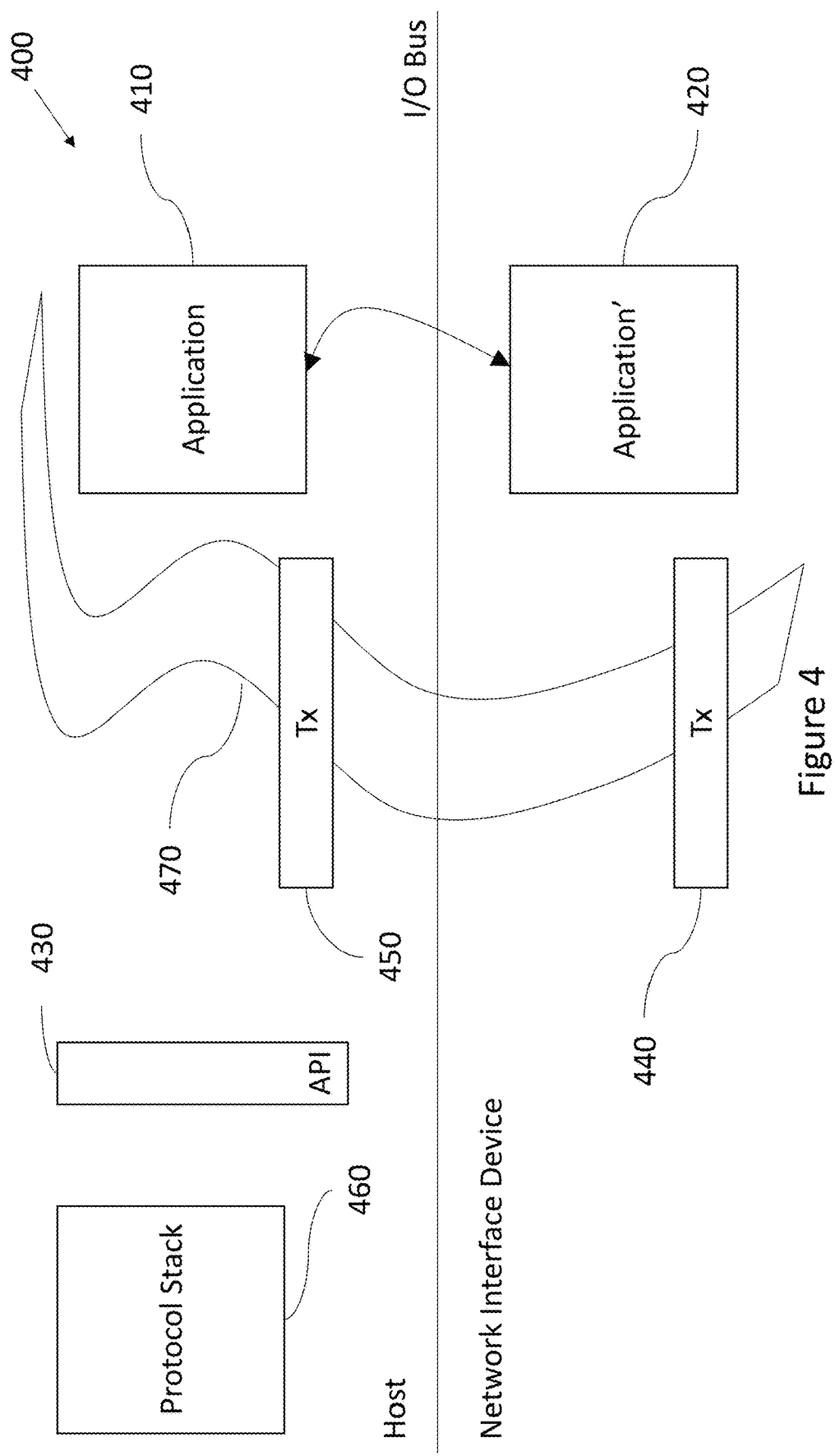
FIG. 4 shows a schematic view of a data processing system comprising an application configured to run on either a host computing device or a network interface device.

Reference is made to FIG. 4, which illustrates how, in accordance with examples of the application, a dynamic selection between the hardware resources of the data processing system on which the application executes may be carried out.

FIG. 4 shows a data processing system in which the application 410/420 may execute in either hardware of the host computing device or hardware of the network interface device. An instance 410 of the application may be configured to run on hardware resources of the host computing device. An instance 420 of the application may be configured to run on the hardware resources on the network interface device. The data processing system may be configured to select between the hardware resources of the host and the hardware resources of the network interface device for the running of the application 410/420 and cause the application 410/420 to run on the selected resources. This selection may be carried out by the runtime support 470 for the application 410/420.

In the following description of FIG. 4 (and in the description of the remaining figures), the runtime support 470 is an example, and the functions (e.g. selection of hardware resources) described as being carried out by the runtime support 470 may in other examples, be carried out by other elements of the data processing. For example, the data processing system may select one or more hardware resources for executing the application 410/420 based on a data structure stored in the memory of the data processing system.

The application 410/420 may be expressed a language, such as OpenCL, P4, Verilog, VHDL, C, C++, Java, or a library/toolkit or development environment such as SDAccel. In some examples, the application 410/420 may be unaware of the particular runtime environment 470 on which the application 410/420 is executing. Use of the API 430 and/or the transmit function 440/450 may be abstracted by the runtime environment 470.

In some examples, the application 410/420 may issues calls to the API 430 and transmit function 440/450, but have no dependency upon where the instances of these functions are executed. Similarly the application may issue calls to cause receive protocol processing by the protocol stack 460 to be carried out, but have no dependency upon where the instances of the API 430 and the protocol stack 460 are executed.

The runtime support 470 may issue requests for access to the hardware resources to the operating system via the API 430.

An instance of the transmit function 440 may be provided in the network interface device to transmit data packets in response to a call from the application 420 running on the hardware resources of the network interface device. An instance of the transmit function 450 may be provided in the host computing device to transmit data packets in response to call from the application 410 running on the hardware resources of the host computing device.

If the application 410 executes on the hardware resources of the host computing device, data may be transmitted over the network in accordance with the steps described above with respect to FIG. 2. If the application 420 executes on the hardware resources of the network interface device, data may be transmitted over the network in accordance with the steps described above with respect to FIG. 3. The protocol stack 460 may run on the host and perform protocol processing and provide headers for data packets to application 410/420, irrespective of the hardware on which the application 410/420 is executing.

If the application 410 executes on the hardware resources of the host computing device, data may be received from over the network and processed in accordance with the steps described above with respect to FIG. 8. If the application 420 executes on the hardware resources of the network interface device, data may be received from over the network in accordance with the steps described above with respect to FIG. 9.

Although the protocol stack 460 is shown as being part of the host computing device, in some examples, the protocol stack may be provided on the network interface device. For example, protocol stacks for some protocols (such as an RDMA) may execute on the network interface device. The protocol stack may be configured to run on an embedded CPU of the network interface device. Such a protocol stack may execute in a host CPU or in hard logic. The operation of such a protocol stack may be transparent to the application.

The API 430 may be a common API that can be accessed and used by the application 410/420 irrespective of whether the application 410/420 executes on the hardware resources of the host computing device or on the hardware resources of the network interface device. The API 430 could be a standard API, such as the POSIX socket API. The run time may perform the offload of Tx/Rx functions where appropriate. Additionally or alternatively, the Tx/Rx functions may be performed by other software (e.g. on a CPU) in the host computing device and/or network interface device. The API 430 may be used to determine available hardware resources. The runtime support 470 may request an indication of available hardware resources from the API 430, which may provide said indication. The API 430 may be configured to determine available hardware resources on the host computing device and on the network interface device.

The API 430 could be any object or abstraction within a library or implemented within the runtime environment of the application. The API 430 could be a component of a virtual-machine or other sandbox or interpreted environments.

The runtime support 470 may be configured to select between hardware resources on the host computing device, and hardware resources on the network interface device for executing the application 410/420. For example, the runtime support 470 may select between a CPU of the host, and an FPGA of the network interface device and cause the application 410/420 to run on one of these. The runtime support 470 may be configured to select between the hardware resources on the host computing device, and hardware resources on the network interface device in dependence upon the available resources on the host and network interface device and the suitability of the available resources given the application's requirements The selection of the resources can be made based on static analysis of the application, on-fly observation of the application's behaviour, analysis of previous execution traces of the application, or static configuration.

Additionally or alternatively, the runtime support 470 may be configured to select between different hardware resources of the network interface device for executing the application. For example, the runtime support 470 may select between an embedded CPU of the network interface device and an FPGA of the network interface device and cause the application to run on one of these.

Figure 5:
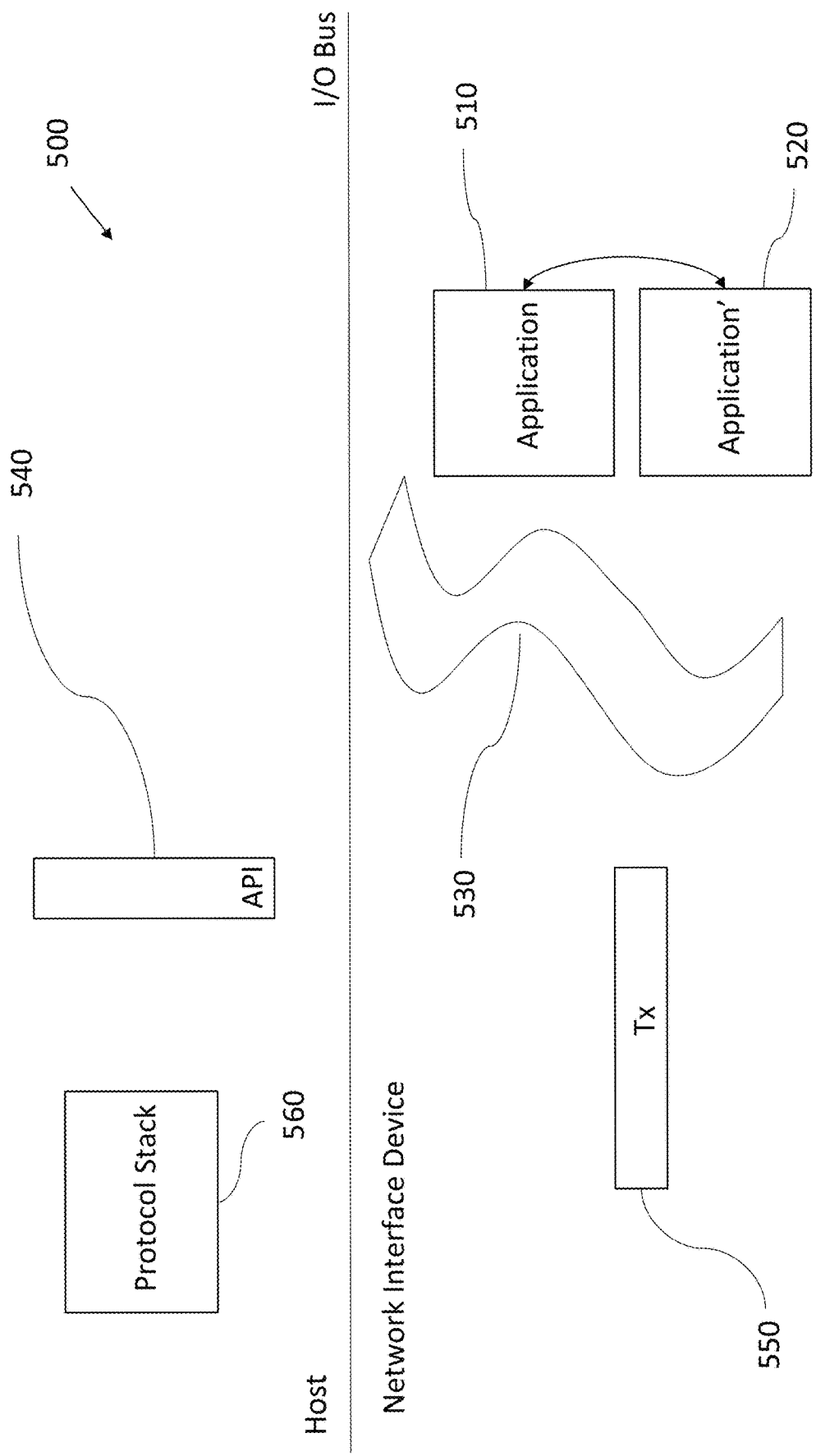
FIG. 5 shows a schematic view of a data processing system comprising an application configured to run on different hardware resources of a network interface device.

Reference is made to FIG. 5, which illustrates in more detail an example in which a selection between different hardware resources on the network interface device is made. It would be appreciated by the skilled person that the selection of hardware resources on the network interface device may be combined with the selection between hardware resources on the host and hardware resources on the network interface device as illustrated in FIG. 4.

One instance 510 of the application may be configured to execute on first hardware resources of the network interface device, whist another instance 520 of the application may be configured to execute on second hardware resources of the network interface device. The runtime support 530 for the application 510/520 may be configured to select between the first hardware resources and the second hardware resources for the running of the application 510/520 and cause the application 510/520 to run on the selected resources.

The application 510/520 may be expressed in a language, such as OpenCL, P4, Verilog, VHDL, C, C++, Java, or a library/toolkit or development environment such as SDAccel. In some examples, the application 510/520 may be unaware of the particular runtime environment 530 on which the application 510/520 is executing. Use of the API 540 and transmit function 550 may be abstracted by the runtime environment 530. In some examples, the application 510/520 may issues calls to the API 540 and transmit function 550, but have no dependency upon where the instances of these functions are executed. Similarly the application 510/520 may issue calls to cause receive protocol processing by the protocol stack 560 to be carried out, but have no dependency upon where the instances of the API 540 and the protocol stack 560 are executed.

The runtime support 530 may issue requests for access to the hardware resources to the operating system via the API 430.

An instance of the transmit function 550 may be provided in the network interface device to transmit data packets in response to a call from the application 510/520 running on the first or second hardware resources of the network interface device.

Application layer data may be formed by the application 510/520 and transmitted over the network in accordance with the steps described above with respect to FIG. 3. The protocol stack 560 may run on the host and perform protocol processing and provide headers for data packets to application 510/520, irrespective of the hardware on which the application 510/520 is executing.

Application layer data may be received from over the network and consumed by the application 510/520 in accordance with the steps described above with respect to FIG. 9.

Although the protocol stack 560 is shown as being part of the host computing device, in some examples, the protocol stack 560 may be provided on the network interface device. The protocol stack 560 may be configured to run on an embedded CPU of the network interface device.

The API 540 may be a common API that can be accessed and used by the application 510/520, irrespective of whether the application 510/520 executes on the first hardware resources or the second hardware resources. The API 540 may be used to determine available hardware resources. The runtime support 530 may request an indication of available hardware resources from the API 540, which may provide said indication. The API 540 may be configured to determine available hardware resources on the network interface device. For example, the API 540 may be configured to determine that the network interface device comprises an embedded CPU and a FPGA on which the application may execute.

The runtime support 530 may be configured to select between the first hardware resources and the second hardware resources for executing the application 510/520. For example, the runtime support 530 may select between an embedded CPU of the network interface device and an FPGA of the network interface device and cause the application 510/520 to run on one of these. The runtime support 530 may be configured to select between the first hardware resources and the second hardware resources in dependence upon the availability of these resources and/or the suitability of the resources for running the application. The selection of the resources can be made based on static analysis of the application, on-fly observation of the application's behaviour, analysis of previous execution traces of the application, and/or static configuration Reference is made to FIG. 6, which illustrates an example method 600 that may be implemented in a data processing system according to examples of the application. It would be appreciated by the skilled person that not all of the steps in the method are essential and that, in some examples one or more steps may be omitted.

At S610, the runtime support for the application requests an indication of the available hardware resources in the data processing system for running the application from the API. The runtime support may be provided by the host computing device and/or the network interface device.

At S620, the API determines the available hardware resources. The API then provides an indication of the available hardware resources to the runtime support. The indication of available hardware resources may comprise an indication of the available hardware resources on the host computing device, and/or an indication of the available hardware resources on the network interface device. Additionally or alternatively, the indication of available hardware resources may comprise an indication of the availability of first and second hardware resources on the network interface device.

The indication of the available hardware resources provided at S620 may comprise an indication of the availability of the functionality provided by the hardware. The indication of the availability of may be an indication of accelerator block availability and suitability. For example, the indication may comprise an indication as to the availability in the hardware of one or more of: cryptographic processing blocks, video processing blocks, machine learning acceleration blocks.

The API may allow the composition of a pipeline of accelerator blocks to be constructed by the runtime support. This may allow additional protocol layers to be more efficiently processed. For example, transport layer security (TLS) processing may be accomplished by pipelining the TCP processing acceleration with hardware encryption/decryption resources. Similarly, for video codecs and compression, TCP processing acceleration may be pipelined with processing resources.

At S630, the runtime support selects hardware resources for running the application. The runtime support may select the hardware resources in dependence upon the indication provided by the API. The runtime support may select between hardware resources on the network interface device and hardware resources on the host computing device. Additionally or alternatively, the runtime support may select between first hardware resources on the network interface device and second hardware resources on the host computing device.

The selection of the hardware resources for running the application that is made at S630 may be performed in dependence upon the availability of the functionality (e.g. the availability of accelerator blocks) provided by the hardware. For example, if the application is required to perform video processing, and it is determined that the network interface device comprises hardware (e.g. an FPGA) having a video processing accelerator block, the runtime support may determine that the application is to run on the appropriate hardware of the network interface device that includes this video processing accelerator block.

The selection of the hardware resources performed at S630, may also depend upon the degree to which the application algorithm can be parallelised in FSM (finite state machines). This may be in contrast to execution as a sequential instruction stream on a CPU/GPU/TPU. For example, if there is a high degree to which the application can be parallelised, the runtime support may select a GPU of the host computing device for executing the application. Alternatively, if there is a low degree to which the application can be parallelised, the runtime support may select an embedded CPU of the network interface device for executing the application.

At S640, the application runs on the selected resources. The application may run on the selected resources indicated to it by the runtime support. The runtime support may issue a request to the operating system on behalf of the application to request use of the selected hardware resources for executing the application.

The application may provide application layer messages for transmission over the network. The application may receive application layer messages from the network.

Figure 6:
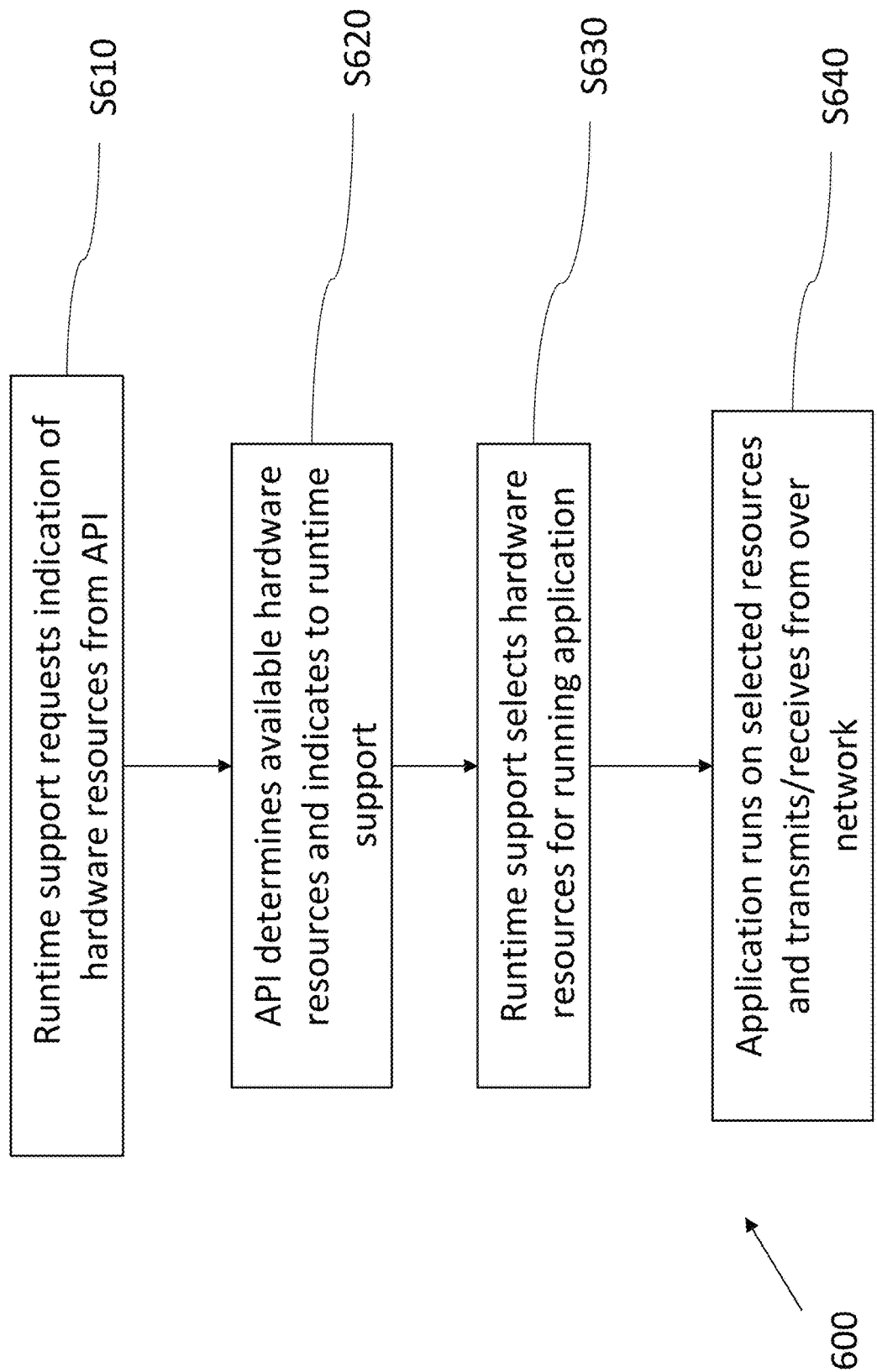
FIG. 6 shows an example of a method for selecting and using hardware resources for running an application.

It should be understood that each block of the flowchart of FIG. 6, and any combination thereof may be implemented by various means or their combinations, such as hardware, software, firmware, one or more processors and/or circuitry.

Figure 7:
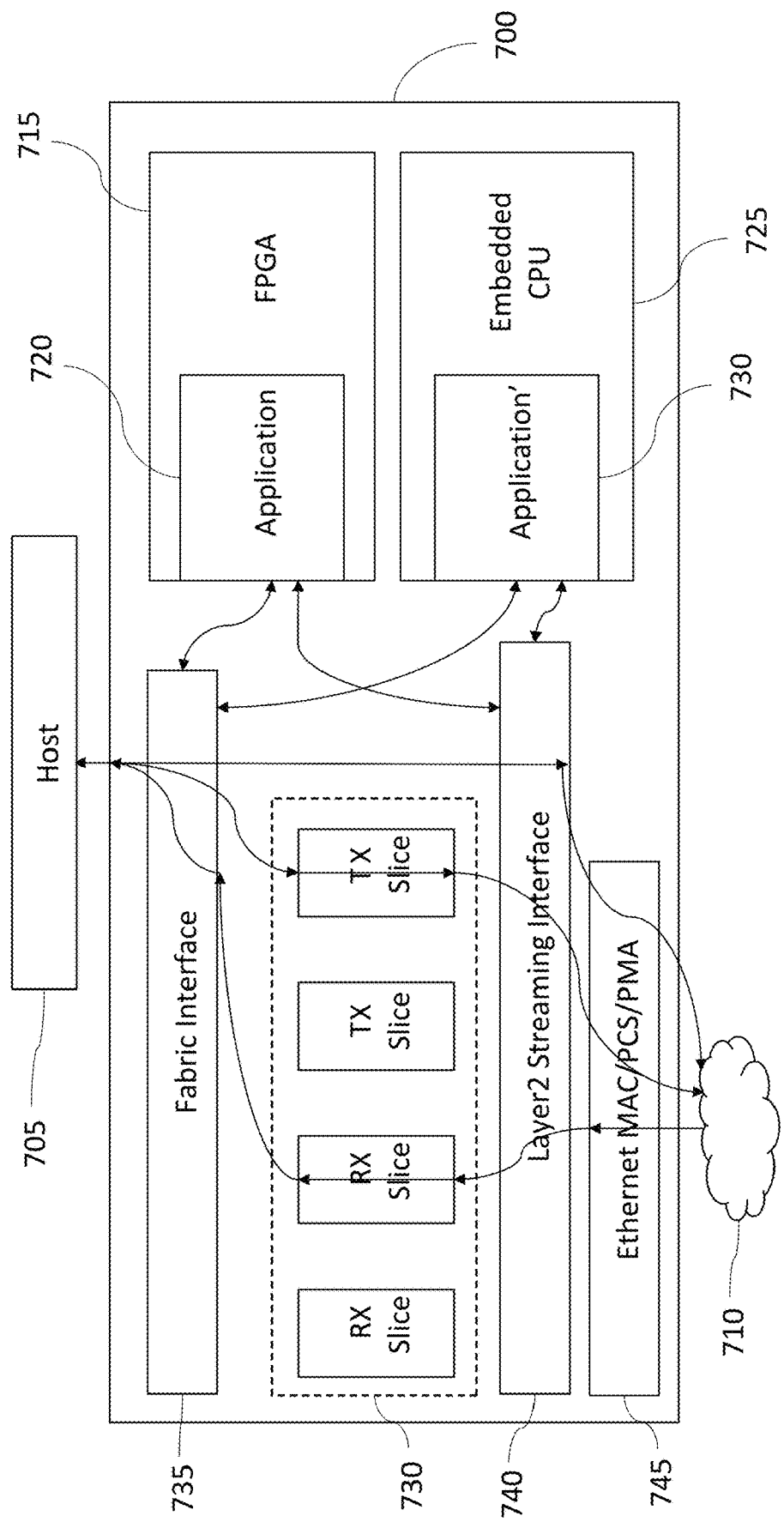
FIG. 7 shows a schematic view of a network interface device arranged to couple a host computing device to a network.

Reference is made to FIG. 7, which shows an example of a network interface device 700 according to examples of the application in more detail.

The network interface device 700 is arranged to couple the host computing device 705 to the network 710. The network interface device comprises first hardware resources 715. The first hardware resources 715 are shown as an FPGA in the example of FIG. 7, but may be a different type of hardware. The network interface device comprises second hardware resources 725. The second hardware resources 725 comprise an embedded CPU. The application 720 may be configured to run on the first hardware resources 715. The application 720 may, therefore, be an FPGA application 715. Additionally or alternatively, the application 730 may be configured to run on the second hardware resources 725.

The network interface device 700 may comprise a transport engine 730, configured to process the data packets in accordance with a transport protocol, such as TCP/IP. The transport engine 730 may comprise a protocol stack. The transport engine 730 may comprise a plurality of slices or data pipeline, some of the slices being RX slices configured to perform receive processing of the ingress data packets received from the network 710, and some of the slices being TX slices configured to perform transmit processing of the egress data packets to be transmitted onto the network 710.

In some embodiments, a slice may be able to handle both data to be transmitted and received data. Each slice may comprise, for example, an application specification integrated circuit (ASIC) or an FPGA.

In some examples, the transport engine 730 may be omitted, with the protocol processing being performed by the host computing device as explained with reference to FIGS. 2 and 3.

The network interface device 700 may comprise a first interface 735 configured to receive data from the host 705 and pass data to the host 705. The first interface 735 may be a fabric interface. The first interface 735 may interface the transport engine 730 with the host computing device 705. Additionally or alternatively, the first interface 735 may interface the application 720/730 running on the first 715 and/or second 725 hardware resources with the host. The first interface 735 may provide an application programming interface, allowing the host 705 to perform memory read and writes to memory associated with the application 720/730.

The network interface device 700 may also comprise a second interface 740 configured to interface the transport engine 730 with the network 710 and configured to interface the application 720/730 with the network 710. The second interface 740 may be a layer 2 streaming interface. The second interface 740 may provide an interface to the network 710 via a third interface 745. The third interface 745 may receive data packets from the second interface 740 and cause them to be transmitted over the network 710. The third interface 745 may similarly receive data packets from the network 710 and pass them to the second interface 740. The third interface 745 may comprise a MAC interface. The third interface 745 may comprise a plurality of MAC interfaces. The third interface 745 may comprise one or more Physical Coding Sublayer (PCS) interfaces. The third interface 745 may comprise one or more Physical Medium Attachment (PMA) interfaces.

The first interface is configured to allow the application 720/730 to receive frames from the host 705. The application 720/730 may be able to transmit frames to the work with data path processing at the same bandwidth as the host PCI.

The layer 2 streaming interface is configure to allow the application 720/730 to receive frames form any active MAC layer interface and to transmit frames to a data path associated with that MAC.

CLAUSES

The following clauses describe aspects of various examples of methods relating to aspects of the invention:

Clause 13. A host computing device comprising:
an interface to a network interface device arranged to couple the host computing device to a network; and
hardware resources configured to run an application,
wherein the host computing device is configured to select between the hardware resources of the host computing device and hardware resources of the network interface device for running the application.

Clause 14. A method implemented in a data processing system, the method comprising:
selecting hardware resources for running an application, the selection being made between hardware resources of a host computing device and hardware resources of a network interface device, wherein the network interface device is arranged to couple the host computing device to a network; and
causing an application to run on the selected hardware resources.

Clause 15. A method implemented in a network interface device, the method comprising:
selecting hardware resources for running an application, the selection being made between first hardware resources of the network interface device and second hardware resources of the network interface device, wherein the network interface device is arranged to couple a host computing device to a network; and causing an application to run on the selected hardware resources.

Clause 16. A method implemented in a host computing device, the method comprising:
selecting hardware resources for running an application, the selection being made between hardware resources of the host computing device and hardware resources of a network interface device, wherein the network interface device is arranged to couple the host computing device to a network; and
causing an application to run on the selected hardware resources.

Clause 17. A non-transitory computer readable medium encoded with instructions that when executed by one or more processors of a data processing system performs a method, the method comprising:
selecting hardware resources for running an application, the selection being made between hardware resources of a host computing device and hardware resources of a network interface device, wherein the network interface device is arranged to couple the host computing device to a network; and
causing an application to run on the selected hardware resources.

Clause 18. A non-transitory computer readable medium encoded with instructions that when executed by one or more processors of a network interface device performs a method, the method comprising:
selecting hardware resources for running an application, the selection being made between first hardware resources of the network interface device and second hardware resources of the network interface device, wherein the network interface device is arranged to couple a host computing device to a network; and
causing an application to run on the selected hardware resources.

Clause 19. A non-transitory computer readable medium encoded with instructions that when executed by one or more processors of a host computing device performs a method, the method comprising:
selecting hardware resources for running an application, the selection being made between hardware resources of the host computing device and hardware resources of a network interface device, wherein the network interface device is arranged to couple the host computing device to a network; and
causing an application to run on the selected hardware resources.

Clause 26. A host computing device comprising:
an interface to a network interface device arranged to couple the host computing device to a network;
hardware resources configured to run a first entity; and
an application programming interface configured to receive requests from the first entity and from a second entity running on the hardware of the network interface device,
wherein operations performed by the application programming interface in response to the requests are independent of whether the requests are received from the first entity or the second entity.

Clause 27. A method implemented in a data processing system, the method comprising:

receiving at an application programming interface, a request from a first entity executing on hardware of a host computing device;

receiving at the application programming interface, a request from a second entity executing on hardware of a network interface device; and the application programming interface performing operations in response to the requests that are independent of whether the requests are received from the first entity or the second entity.

Clause 28. A method implemented in a host computing device, the method comprising:

receiving at an application programming interface, a request from a first entity executing on hardware of the host computing device;

receiving at the application programming interface, a request from a second entity executing on hardware of a network interface device; and the application programming interface performing operations in response to the requests that are independent of whether the requests are received from the first entity or the second entity.

Clause 29. A non-transitory computer readable medium encoded with instructions that when executed by one or more processors of a data processing system performs a method, the method comprising:

receiving at an application programming interface, a request from a first entity executing on hardware of a host computing device;

receiving at the application programming interface, a request from a second application executing on hardware of a network interface device; and the application programming interface performing operations in response to the requests that are independent of whether the requests are received from the first entity or the second entity.

Clause 30. A non-transitory computer readable medium encoded with instructions that when executed by one or more processors of a host computing device performs a method, the method comprising:

receiving at an application programming interface, a request from a first entity executing on hardware of the host computing device;

receiving at the application programming interface, a request from a second entity executing on hardware of a network interface device; and the application programming interface performing operations in response to the requests that are independent of whether the requests are received from the first entity or the second entity.

Various example standards and protocols have been discussed. It should be appreciated that this is by way of example only and other embodiments may use any other suitable protocol or standard.

The network interface device discussed in the application may be provided by one or more of circuitry, hardware, and software. Likewise, the host computing device may be provided by one or more of circuitry, hardware, and software.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A network interface device arranged to couple a host computing device to a network, the network interface device comprising:

first hardware resources and second hardware resources;

an application configured to: run on one or more of the first and second hardware resources of the network interface device;

an entity running on hardware of the network interface device, wherein the entity comprises components of at least one runtime support running on hardware of the network interface device, which supports the application, wherein the at least one runtime support is configured to:

make requests to an application programming interface of the host computing device;

receive, from the application programming interface, an indication of available hardware resources of the network interface device; and select between available resources of the first hardware resources and the second hardware resources to determine a selected hardware resource for running the application on the network interface device, so that at least a part of the application runs on the selected hardware resource on the network interface device.

2. A network interface device as claimed in claim 1, wherein the network interface device is configured to select between the first hardware resources and the second hardware resources in dependence upon at least one of: system workload; availability of the first hardware resources; and availability of the second hardware resources.

3. A network interface device as claimed in claim 1, wherein the at least one runtime support comprises a virtual machine environment.

4. A network interface device as claimed in claim 1, wherein the application comprises at least one of:

form a message for transmission over the network; and consume a message received over the network.

5. A data processing system comprising:

a host computing device comprising hardware resources;

a network interface device arranged to couple the host computing device to a network, the network interface device comprising hardware resources; and an application programming interface configured to receive requests from a first entity running on the hardware of the host computing device and a second entity running on the hardware of the network interface device, wherein the first entity comprises a first application and the second entity comprises a second application, wherein first entity comprises components of at least one first runtime support, and the second entity comprises components of at least one second runtime support, wherein the components of the at least one first runtime support, which supports the first application, are configured to run on at least one of the host computing device and the network interface device, and wherein the components of the at least one second runtime support, which supports the second application, are configured to run on at least one of the host computing device and the network interface device, wherein operations performed by the application programming interface in response to the requests are independent of whether the requests are received from the first entity or the second entity, wherein the application programming interface is configured to receive requests from the first and second applications to determine available hardware resources of the data processing system, and wherein the components of the at least one first and second runtime supports are configured to select between the determined available hardware resources of the host computing device and the hardware resources of the network interface device for running the first and second applications.

6. A data processing system as claimed in claim 5, wherein the first entity and the second entity are different instances of an application.

7. A data processing system as claimed in claim 5, wherein the requests comprise at least one of: requests for access to hardware resources on behalf of an application; and requests for an indication as to the availability of hardware resources of the data processing system.

8. A data processing system as claimed in claim 5, wherein responses to the requests provided by the application programming interface are independent of the hardware on which the first entity and the second entity execute.

9. A data processing system as claimed in claim 5, wherein the data processing system is configured to select between the hardware resources of the network interface device and the hardware resources of the host computing device in dependence upon at least one of: system workload; availability of the hardware resources of the host computing device; and availability of the hardware resources of the network interface device.

10. A data processing system as claimed in claim 5, wherein the application is configured to at least one of:
    form a message for transmission over the network; and
    consume a message received over the network.

* * * * *